(12) United States Patent
Chang et al.

(10) Patent No.: US 12,108,131 B2
(45) Date of Patent: Oct. 1, 2024

(54) ASSEMBLING METHOD FOR OPTICAL SYSTEM

(71) Applicant: TDK TAIWAN CORP., Taoyuan (TW)

(72) Inventors: Shao-Chung Chang, Taoyuan (TW); Chan-Jung Hsu, Taoyuan (TW); Yi-Ho Chen, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 374 days.

(21) Appl. No.: 17/487,305

(22) Filed: Dec. 14, 2021

(65) Prior Publication Data

US 2022/0099912 A1 Mar. 31, 2022

(51) Int. Cl.
| | |
|---|---|
| *G02B 7/04* | (2021.01) |
| *G02B 7/02* | (2021.01) |
| *G02B 7/08* | (2021.01) |
| *G02B 7/09* | (2021.01) |
| *G02B 27/62* | (2006.01) |
| *G02B 27/64* | (2006.01) |
| *G03B 5/00* | (2021.01) |
| *H02K 33/02* | (2006.01) |
| *H02K 33/06* | (2006.01) |
| *H02K 33/18* | (2006.01) |
| *H04N 23/51* | (2023.01) |
| *H04N 23/55* | (2023.01) |
| *H04N 23/60* | (2023.01) |
| *G01D 5/12* | (2006.01) |

(52) U.S. Cl.
CPC ............. *H04N 23/55* (2023.01); *G02B 7/025* (2013.01); *G02B 7/04* (2013.01); *G02B 7/08* (2013.01); *G02B 7/09* (2013.01); *G02B 27/62* (2013.01); *G02B 27/646* (2013.01); *G03B 5/00* (2013.01); *H02K 33/02* (2013.01); *H02K 33/06* (2013.01); *H02K 33/18* (2013.01); *H04N 23/51* (2023.01); *H04N 23/60* (2023.01); *G01D 5/12* (2013.01); *G03B 2205/0069* (2013.01)

(58) Field of Classification Search
CPC ........... G02B 7/025; G02B 7/04; H04N 23/55
See application file for complete search history.

(56) References Cited

U.S. PATENT DOCUMENTS

2010/0038017 A1* 2/2010 Egawa ............. H01L 27/14618
156/145

* cited by examiner

*Primary Examiner* — Daniel McNally
(74) *Attorney, Agent, or Firm* — MUNCY, GEISSLER, OLDS & LOWE, PC

(57) ABSTRACT

An assembling method for an optical system is provided, including: providing a first movable portion, connecting the first movable portion to a first fixed portion, providing a second movable portion, connecting the second movable portion to a second fixed portion, engaging the first fixed portion to the second fixed portion, adjusting the position of the first movable portion relative to the first fixed portion to a first predetermined position and temporarily affixing the first movable portion in the first predetermined position, affixing a first optical member to the first movable portion, and affixing a second optical member to the second movable portion.

19 Claims, 12 Drawing Sheets

A-A

ASSEMBLING METHOD FOR OPTICAL SYSTEM

BACKGROUND OF THE INVENTION

Field of the Invention

The application relates in general to an assembling method, and in particular, to an assembling method of an optical system.

Description of the Related Art

Advanced technology has allowed recent electronic devices (such as tablet computers and smartphones) to include a lens module capable of aiding in photography or recording video. These electronic devices have become more commonplace, and have been developed to be more convenient and thin. More and more choices are provided for users to choose from.

However, an image may come out blurry if the user shakes the lens module in the electronic device. To improve image quality, it is increasingly important to design a shockproof zoom lens module.

BRIEF SUMMARY OF INVENTION

An assembling method for an optical system is provided, including providing a first movable portion, connecting the first movable portion to a first fixed portion, providing a second movable portion, connecting the second movable portion to a second fixed portion, engaging the first fixed portion to the second fixed portion, adjusting the position of the first movable portion relative to the first fixed portion to a first predetermined position and temporarily affixing the first movable portion in the first predetermined position, affixing a first optical member to the first movable portion, and affixing a second optical member to the second movable portion.

In some embodiments, the step of affixing the first optical member to the first movable portion includes: disposing a sticking member between the first optical member and the first movable portion, and curing the sticking member, wherein the sticking member comprises a light-curing glue.

In some embodiments, the step of temporarily affixing the first movable portion in the first predetermined position comprises: using a jig to affix the first movable portion relative to the first fixed portion.

In some embodiments, the assembling method further comprises removing the jig after the step of affixing the first optical member to the first movable portion.

In some embodiments, the step of temporarily affixing the first movable portion in the first predetermined position comprises: providing a driving assembly, and using the driving assembly to apply a driving force to the first movable portion.

In some embodiments, the assembling method further comprises: after the step of affixing the first optical member to the first movable portion, the driving assembly stops applying the driving force to the first movable portion.

In some embodiments, the step of connecting the first movable portion to a first fixed portion comprises: using an elastic member to connect the first movable portion and the first fixed portion, wherein the elastic member applies a preload to the first movable portion.

In some embodiments, the step of affixing the second optical member to the second movable portion comprises: disposing a first adhesive member between the second optical member and the second movable portion, and curing the first adhesive member, wherein the first adhesive member comprises a heat-curing glue.

In some embodiments, the assembling method further comprises: before curing the first adhesive member, moving the second optical member to align the optical axis of the second optical member to the optical axis of the first optical member.

In some embodiments, the step of affixing the second optical member to the second movable portion further comprises: connecting a second adhesive member to the second optical member and the second movable portion, and curing the second adhesive member, wherein the second adhesive member comprises a light-curing glue. The second adhesive member is closer to the edge of the second movable portion than the first adhesive member.

In some embodiments, the assembling method further comprises: before the step of affixing the second optical member to the second movable portion, adjusting the position of the second movable portion to a second predetermined position, and temporarily affixing the second movable portion in the second predetermined position.

The invention also provides an assembling method for an optical system, including: providing a first movable portion, connecting the first movable portion to a first fixed portion, providing a second movable portion, connecting the second movable portion to a second fixed portion, engaging the first fixed portion to the second fixed portion, adjusting the position of the second movable portion to a predetermined position and temporarily affixing the second movable portion in the predetermined position, affixing a second optical member to the second movable portion, and affixing a first optical member to the first movable portion.

In some embodiments, the step of temporarily affixing the second movable portion in the predetermined position comprises: using a jig to affix the second movable portion relative to the second fixed portion.

In some embodiments, the assembling method further comprises: after the step of affixing the second optical member to the second movable portion, removing the jig.

In some embodiments, the step of temporarily affixing the second movable portion in the predetermined position comprises: providing a driving assembly, and using the driving assembly to apply a driving force to the second movable portion.

In some embodiments, the assembling method further comprises: after the step of affixing the second optical member to the second movable portion, the driving assembly stops applying the driving force to the second movable portion.

In some embodiments, the step of connecting the second movable portion to a second fixed portion comprises: using an elastic member to connect the second movable portion and the second fixed portion, wherein the elastic member applies a preload to the second movable portion.

In some embodiments, the assembling method further comprises: before the step of affixing the first optical member to the first movable portion, moving the first optical member to align the optical axis of the first optical member to the optical axis of the second optical member.

BRIEF DESCRIPTION OF DRAWINGS

The disclosure can be more fully understood by reading the subsequent detailed description and examples with references made to the accompanying drawings, wherein.

DETAILED DESCRIPTION OF INVENTION

The making and using of the embodiments of the optical system and the assembling method thereof are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood by one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
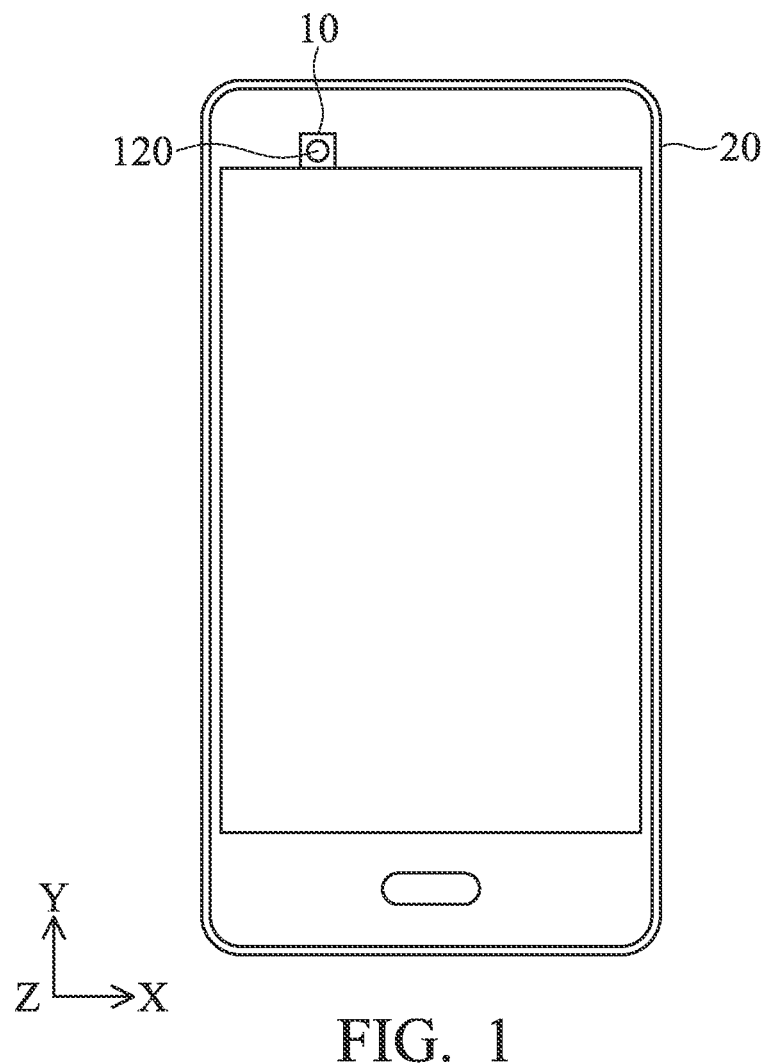
FIG. 1 is a schematic diagram of an optical system and an electronic device according to an embodiment of the invention.

Referring to FIG. 1, in an embodiment of the invention, an optical system 10 can be disposed in an electronic device 20 and used to take photographs or record video. For example, the electronic device 20 can be a smartphone, a tablet computer, or a digital camera, but it is not limited thereto. When taking photographs or recording video, the optical system 10 can receive lights and form images, wherein the images can be transmitted to a processor (not shown) in the electronic device 20, where post-processing of the images can be performed.

Figure 2:
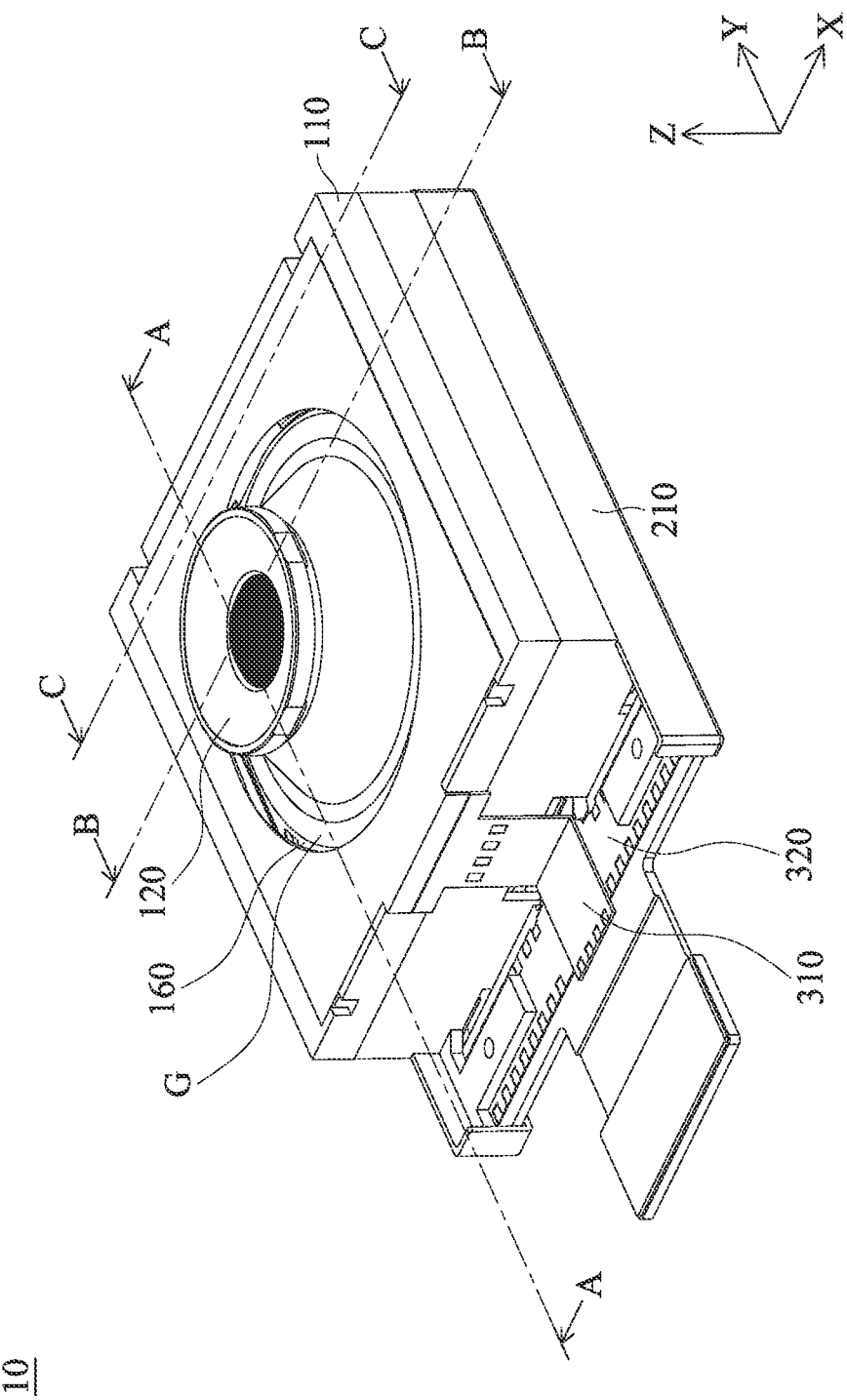
FIG. 2 is a schematic diagram of the optical system according to an embodiment of the invention.
Figure 3A:
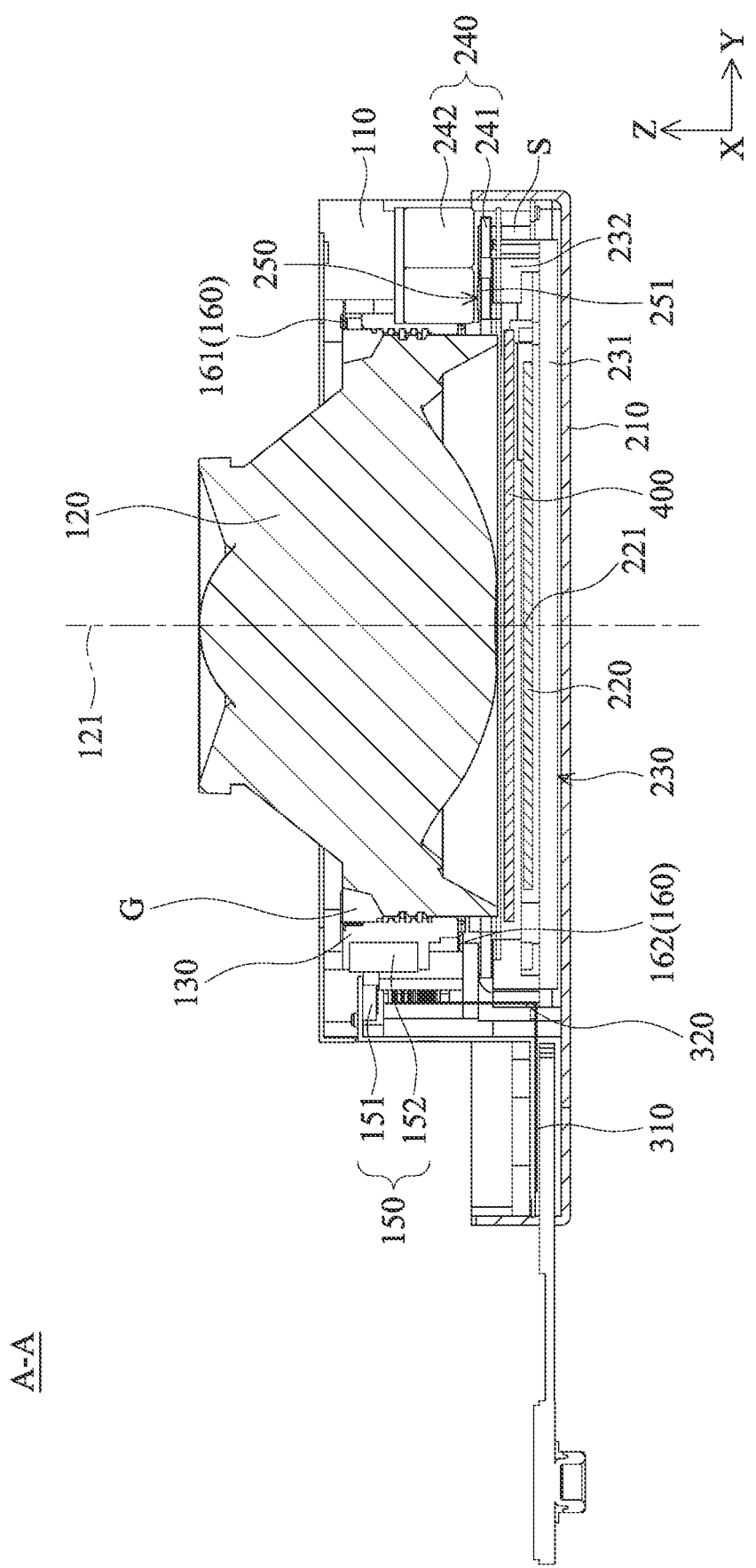
FIG. 3A is a cross-sectional view along line A-A in FIG. 1.
Figure 3B:
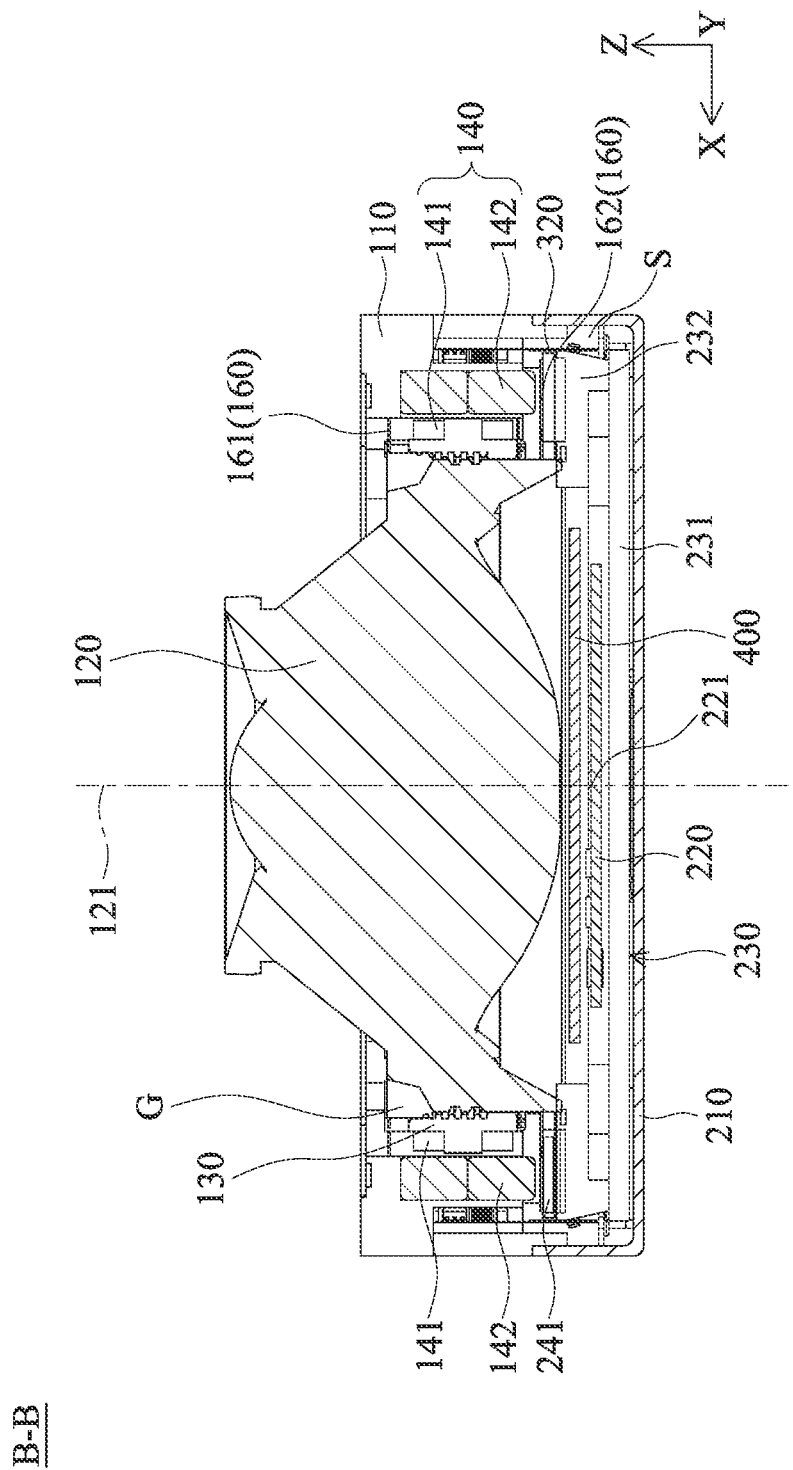
FIG. 3B is a cross-sectional view along line B-B in FIG. 1.

FIG. 2 is a schematic diagram of the optical system 10, FIG. 3A is a cross-sectional view along line A-A in FIG. 2, and FIG. 3B is a cross-sectional view along line B-B in FIG. 2. As shown in FIGS. 2, 3A, and 3B, the optical system 10 primarily includes a first fixed portion 110, a first optical member 120, a first movable portion 130, a driving assembly 140, a position detecting assembly 150, at least one elastic member 160, a second fixed portion 210, a second optical member 220, a second movable portion 230, a driving assembly 240, a position detecting assembly 250, a plurality of circuit boards 310 and 320, and a transparent member 400.

The first fixed portion 110 and the second fixed portion 210 are respectively the upper housing and the lower housing of the optical system, so that they can be engaged together to form an accommodating space S. The first optical member 120, the first movable portion 130, the driving assembly 140, the position detecting assembly 150, the elastic member 160, the second optical member 220, the second movable portion 230, the driving assembly 240, the position detecting assembly 250, and the transparent member 400 can be accommodated in the accommodating space S, so as to protect the aforementioned members and prevent the aforementioned members from impacting with other component(s) in the electronic device 20 and causing failure.

The first optical member 120 can be a camera lens, and the first movable portion 130 can be a holder. The first optical member 120 can be affixed to the first movable portion 130 via a sticking member G (such as a light-curing glue), and the first movable portion 130 can be movably connected to the first fixed portion 110 via the elastic member 160. In this embodiment, the elastic member 160 includes an upper spring sheet 161 and a lower spring sheet 162. The upper spring sheet 161 is connected to the first fixed portion 110 and the upper surface of the first movable portion 130. The lower spring sheet 162 is connected to the first fixed portion 110 and the lower surface of the first movable portion 130. Therefore, the first movable portion 130 can be hung in the accommodated space S via the upper spring sheet 161 and the lower spring sheet 162.

The driving assembly 140 includes at least one first electromagnetic driving member 141 and at least one second electromagnetic driving member 142. The first electromagnetic driving member 141 and the second electromagnetic driving member 142 correspond to each other and are respectively disposed on the first movable portion 130 and the first fixed portion 110. In this embodiment, the first electromagnetic driving member 141 is the driving coil, and the second electromagnetic driving member 142 is the magnet. In some embodiments, the first electromagnetic driving member 141 is the magnet, and the second electromagnetic driving member 142 is the driving coil.

When current flows through the driving coil, an electromagnetic effect is generated between the driving coil and the magnet, and a magnetic pushing force can be applied on the first movable portion 130. Thus, the first movable portion 130 and the first optical member 120 disposed thereon can be driven to move relative to the first fixed portion 110 along the Z-axis, so as to achieve the purpose of focus adjustment.

The position detecting assembly 150 is used to detect the movement of the first movable portion 130 relative to the first fixed portion 110. In detail, the position detecting assembly 150 includes a sensor 151 and a sensing object 152, wherein the sensor 151 is affixed relative to the first fixed portion 110, and the sensor 151 is disposed on the first movable portion 130. When the driving assembly 140 drives the first movable portion 130 to move, the sensing object 152 is driven to move accordingly. Therefore, the sensor 151 can determine the movement of the first movable portion 130 by detecting the position of the sensing object 152.

For example, the sensor 151 can be a hall sensor, a magnetoresistance effect sensor (MR sensor), a giant magnetoresistance effect sensor (GMR sensor), a tunneling magnetoresistance effect sensor (TMR sensor), a fluxgate sensor, an optical encoder, or an infrared sensor. When the hall sensor, the magnetoresistance effect sensor, the giant magnetoresistance effect sensor, or the tunneling magnetoresistance effect sensor is used as the sensor 151, the sensing object 152 can be a magnet. When the optical encoder or the infrared sensor is used as the sensor 151, the sensing object 152 can be a reflective sheet.

In this embodiment, the sensor 151 is disposed on the circuit board 310, and the circuit board 310 can extend from the accommodating space S to the external area of the optical system 10 to connect to other electronic components in the electronic device 20. Therefore, the sensor 151 can be electrically connected to the electronic components in the electronic device 20 via the circuit board 310. Moreover, in this embodiment, the circuit board 310 is electrically connected to the upper spring sheet 161 of the elastic member 160, and the upper spring sheet 161 is electrically connected to the first electromagnetic driving member 141. Thus, the electronic components in the electronic device 20 (such as the power supply) can provide current to the first electromagnetic driving member 141 via the circuit board 310 and the upper spring sheet 161.

Figure 3C:
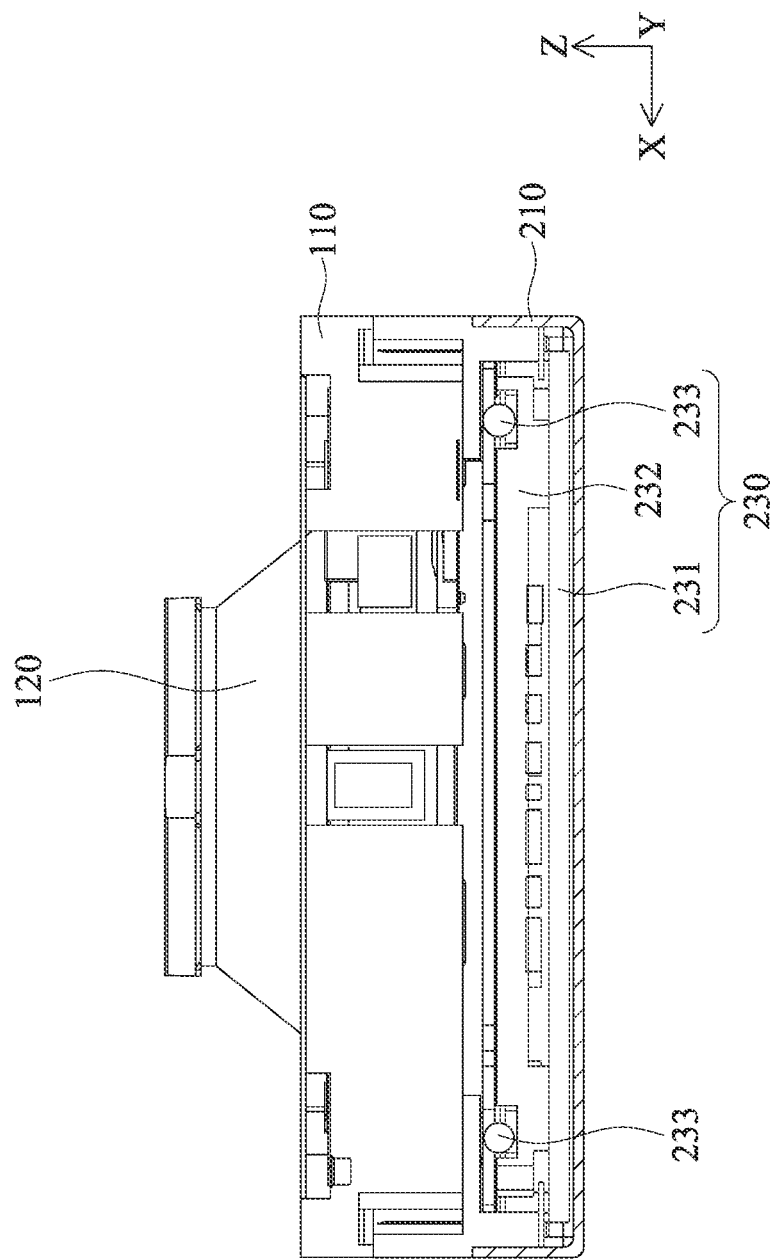
FIG. 3C is a cross-sectional view along line C-C in FIG. 1.
Figure 4:
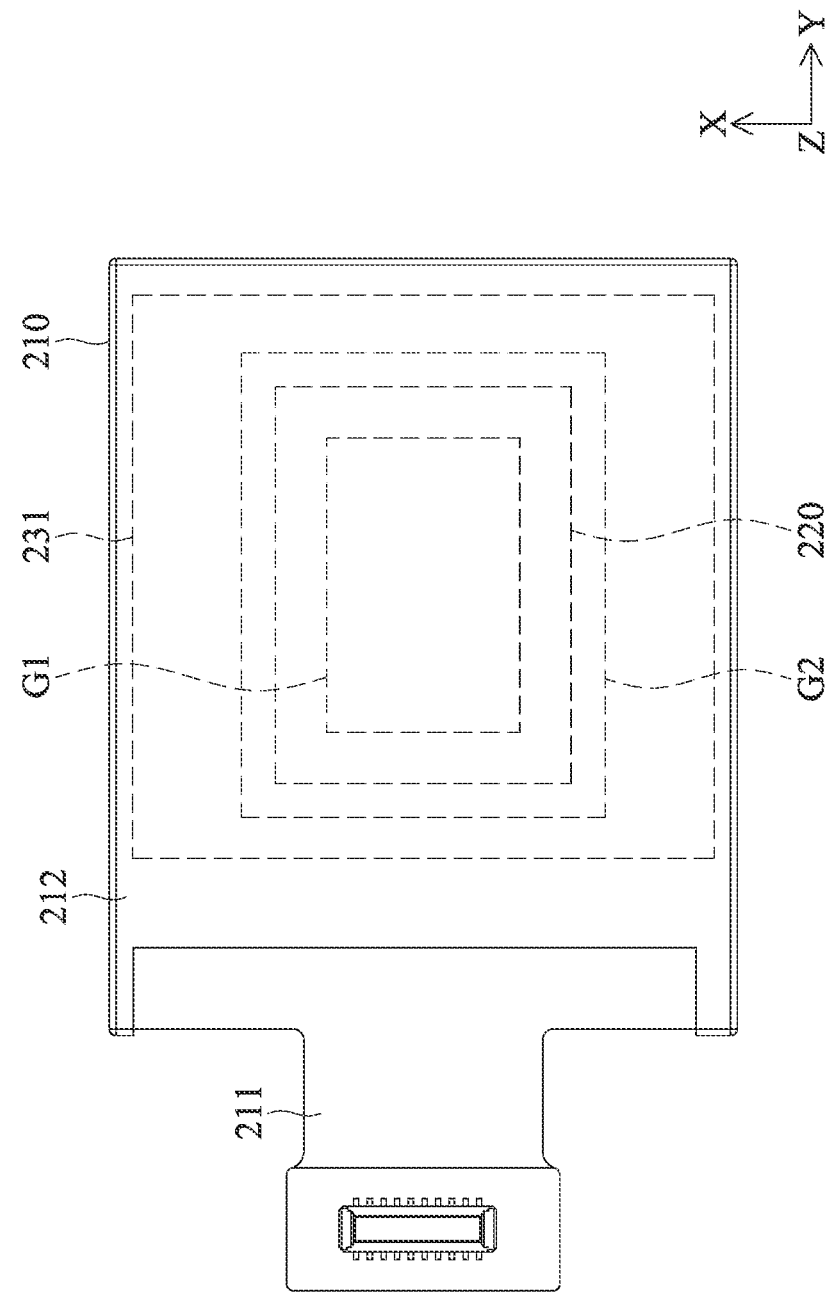
FIG. 4 is a bottom view of the optical system according to an embodiment of the invention.

FIG. 3C is a cross-sectional view along line C-C in FIG. 2, and FIG. 4 is a bottom view of the optical system 10. Referring to FIG. 2 to FIG. 4, the second optical member 220 is an image sensor, and the second movable portion 230 includes a substrate 231, a frame 232, and a plurality of balls 233. The second optical member 220 and the frame 232 are disposed on the substrate 231. The frame 232 surrounds the second optical member 220, and the frame 232 is movably connected to the second fixed portion 210 via the balls 233.

The second optical member 220 can be affixed to the substrate 231 via a first adhesive member G1 and a second adhesive member G2. The first adhesive member G1 is disposed between the second optical member 220 and the substrate 231, and the second adhesive member G2 is connected to the second optical member 220 and the substrate 231 at the lateral sides of the second optical member 220. Therefore, the second adhesive member G2 surrounds the second optical member 220 and the first adhesive member G1, and the second adhesive member G2 is closer to the edge of the substrate 231 than the first adhesive member G1. In this embodiment, in order to facilitate the curing of the first adhesive member G1, which is surrounded by the second adhesive member G2, the first adhesive member G1 can include a heat-curing glue, and the second adhesive member G2 can include a light-curing glue.

The optical axis 121 of the first optical member 120 is substantially aligned with the optical axis 221 of the second optical member 220, and the transparent member 400 is disposed between the first optical member 120 and the second optical member 220. Thus, the external light can pass through the first optical member 120 and the transparent member 400 in sequence, and then reach the second optical member 200 and form an image on the second optical member 220. In this embodiment, the transparent member 400 can be a filter.

The driving assembly 240 includes at least one first electromagnetic driving member 241 and at least one second electromagnetic driving member 242. The first electromagnetic driving member 241 and the second electromagnetic driving member 242 correspond to each other and are respectively disposed on the frame 232 and the first fixed portion 110. In this embodiment, the first electromagnetic driving member 241 is a coil plate, and the second electromagnetic driving member 242 is a magnet.

When current flows through the coil plate, an electromagnetic effect is generated between the coil plate and the magnet, and a magnetic pushing force can be applied on the frame 232. Thus, the second movable portion 230 and the second optical member 220 disposed thereon can be driven to move relative to the second fixed portion 210 along the X-axis and/or the Y-axis, so as to achieve the purpose of optical image stabilization (OIS).

The position detecting assembly 250 is used to detect the movement of the second movable portion 230 relative to the second fixed portion 210. In detail, the position detecting assembly 250 includes a sensor 251 disposed on the second electromagnetic driving member 242 and corresponding to the first electromagnetic driving member 241 and/or the second electromagnetic driving member 142. When the driving assembly 240 drives the second movable portion 230 to move, the sensor 251 is driven to move accordingly. Therefore, the sensor 251 can determine the movement of the second movable portion 230 by detecting the relative position between the sensor 251 and the first electromagnetic driving member 241 and/or the second electromagnetic driving member 142.

For example, the sensor 251 can be a hall sensor, a magnetoresistance effect sensor, a giant magnetoresistance effect sensor, a tunneling magnetoresistance effect sensor (TMR sensor), or a fluxgate sensor.

In this embodiment, the first electromagnetic driving member 241 is electrically connected to the circuit board 320, and the circuit board 320 can extend from the accommodating space S to the external area of the optical system 10 to connect to other electronic components in the electronic device 20. Therefore, the electronic components in the electronic device 20 can be electrically connected to the first electromagnetic driving member 241 and the sensor 151 via the circuit board 320, and the current or the signal can be transmitted therebetween.

Figure 5A:
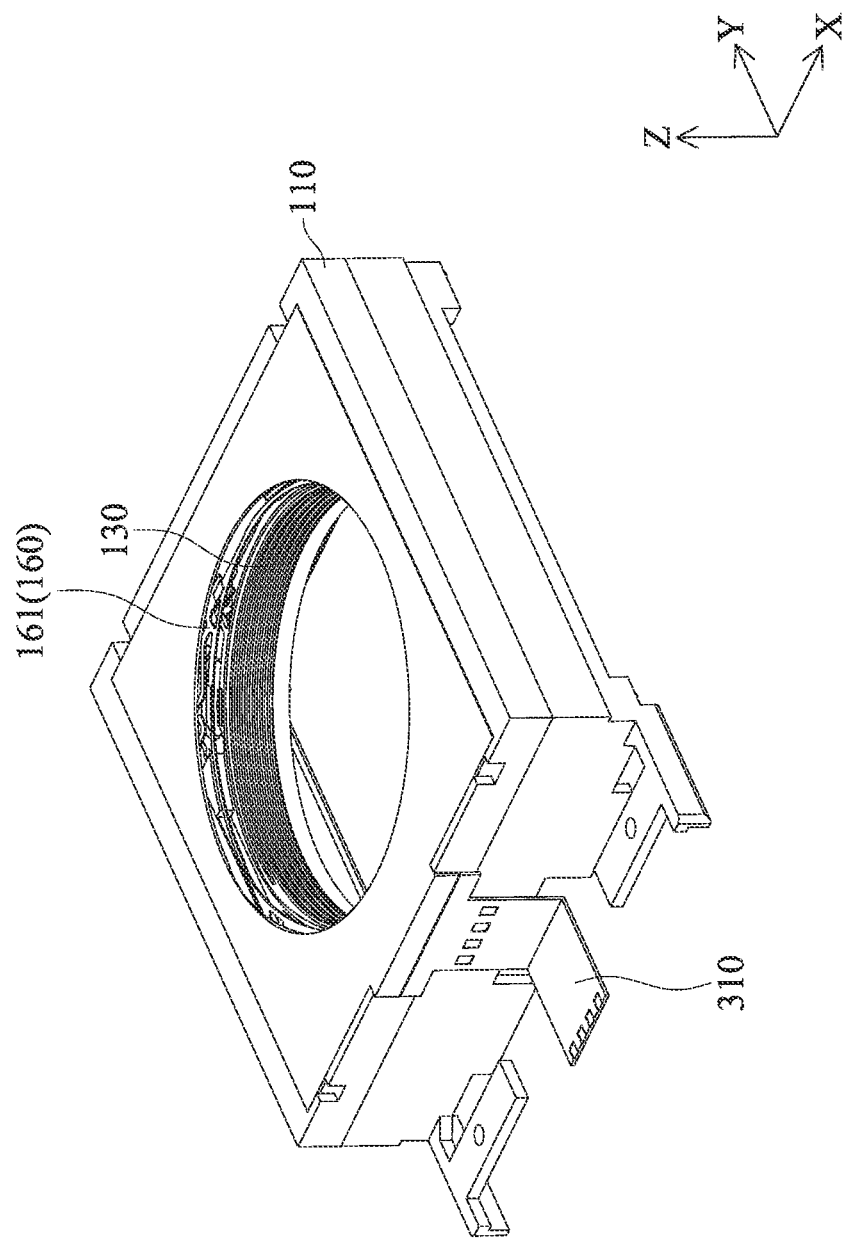
FIG. 5A is a schematic diagram of an integrated component according to an embodiment of the invention.
Figure 5B:
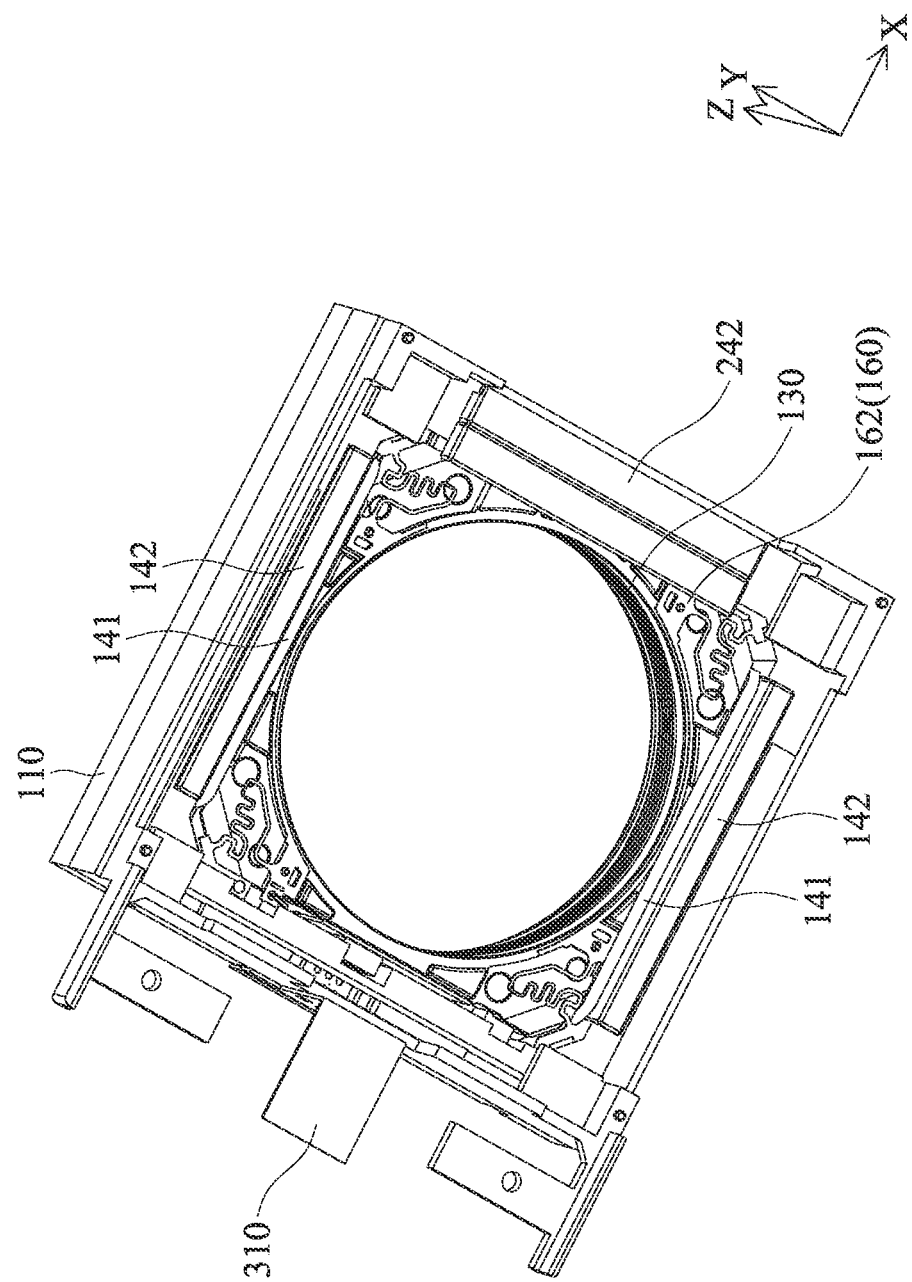
FIG. 5B is a schematic diagram of the integrated component in another view according to an embodiment of the invention.

The assembling method of the optical system 10 is discussed below. Referring to FIG. 5A and FIG. 5B, first, the user can use the elastic member 160 to connect the first movable portion 130 to the first fixed portion 110, dispose the first electromagnetic driving member 141 and the sensing object 152 on the first movable portion 130, dispose the second electromagnetic driving member 142, the second electromagnetic driving member 242 and the circuit board 310 on the first fixed portion 110, and disposed the sensor 151 on the circuit board 310, so as to form an integrated component C1.

Figure 5C:
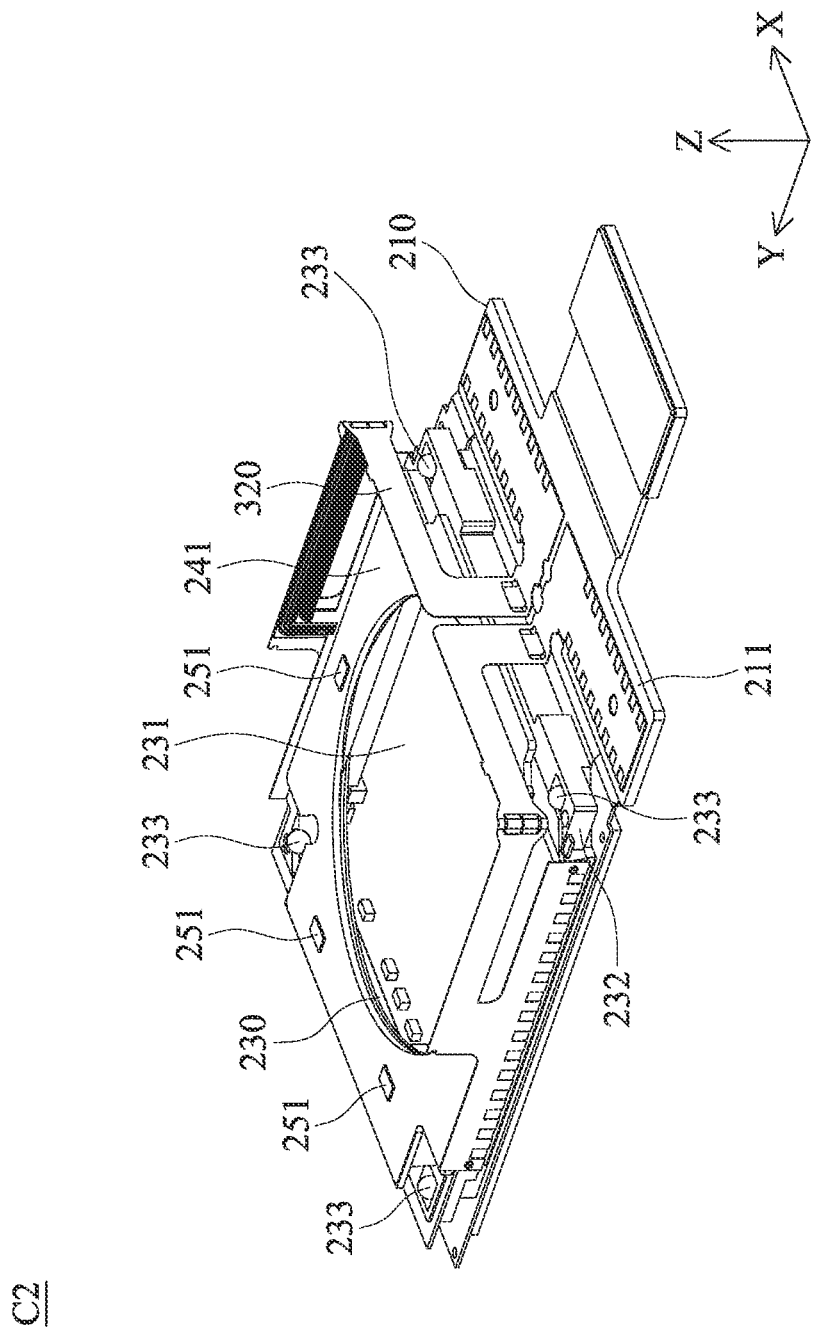
FIG. 5C is a schematic diagram of another integrated component according to an embodiment of the invention.

Referring to FIG. 5C, the second movable portion 230 is movably connected to the second fixed portion 210, the first electromagnetic driving member 241 is disposed on the movable portion 230, the sensor 251 is disposed on the first electromagnetic driving member 241, and the circuit board 320 is disposed on the second fixed portion 210, so that another integrated component C2 can be formed. It should be that, in this embodiment, the second fixed portion 210 includes a first housing 211 and a second housing 212, and the integrated component C2 merely includes the first housing 211 (the second housing 211 is assembled in the later step).

Figure 5D:
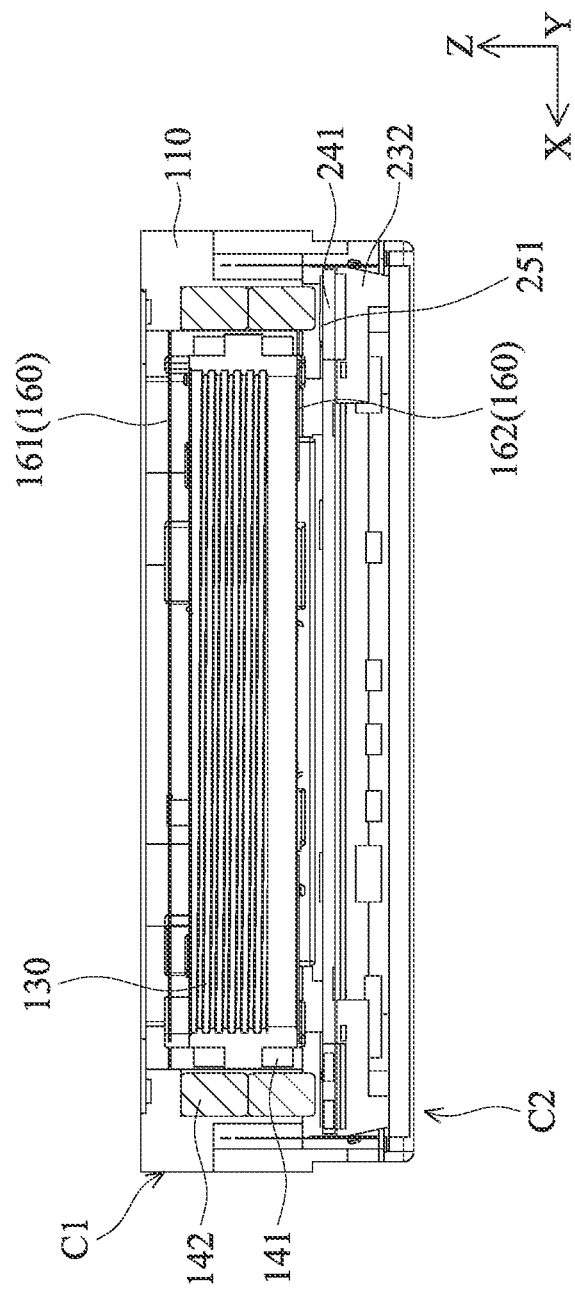
FIG. 5D is a schematic diagram represents that the integrated component is engaged with the another integrated component according to an embodiment of the invention.

Next, as shown in FIG. 5D, the first housing 211 of the second fixed portion 210 can be affixed to the first fixed portion 110, so that the integrated component C1 can be engaged to the integrated component C2.

Figure 5E:
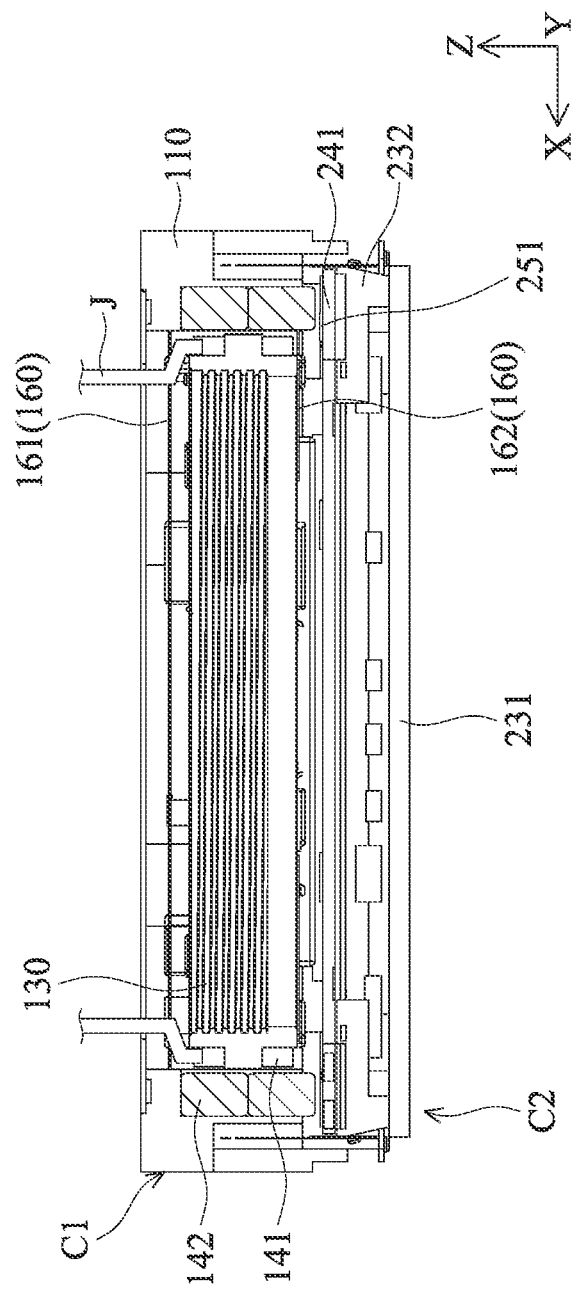
FIG. 5E is a schematic diagram represents that the first movable portion and the second movable portion are temporarily affixed according to an embodiment of the invention.

Sequentially, as shown in FIG. 5E, the user can adjust the position of the first movable portion 130 relative to the first fixed portion 110 to a first predetermined position, and temporarily affix the first movable portion 130 in the first predetermined position. At the same time, the user can adjust the position of the second movable portion 230 relative to the second fixed portion 210 to a second predetermined position, and temporarily affix the second movable portion 230 in the second predetermined position. In this embodiment, the first movable portion 130 is temporarily affixed by a jig J, and the second movable portion 230 is temporarily affixed by the driving force from the driving assembly 240.

In some embodiments, the first movable portion 130 can be temporarily affixed to the first predetermined position by the driving force from the driving assembly 240 and/or the preload (the elastic force) of the elastic member 160. In some embodiments, the second movable portion 230 is affixed to the second predetermined position by another jig, or affixed to the second predetermined position by the preload of another elastic member.

Figure 5F:
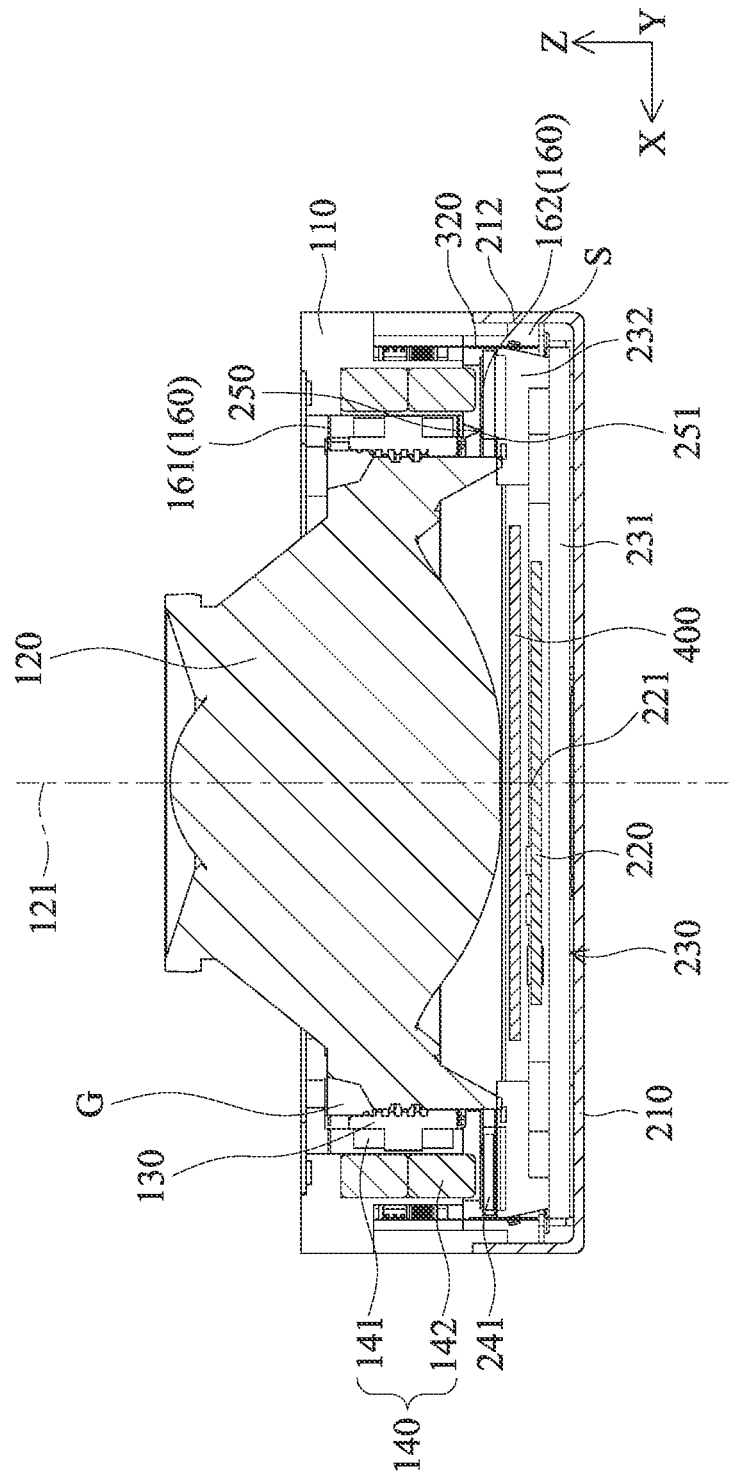
FIG. 5F is a schematic diagram represents that a first optical member and a second optical member are assembled according to an embodiment of the invention.

Finally, as shown in FIG. 5F, the sticking member G can be provided, and the first optical member 120 can be affixed to the first movable portion 130 by curing the sticking member G. The first adhesive member G1 and the second adhesive member G2 can be also provided, and the second optical member 220 can be affixed to the second movable portion 230 by curing the first adhesive member G1 and the second adhesive member G2 in sequence. The transparent member 400 can be disposed between the first optical member 120 and the second optical member 220. The jig J or the driving force that is used to temporarily affix the first movable portion 130 can be removed, the jig or the driving force that is used to temporarily affix the second movable portion 230 can be removed, and the second housing 212 can be engaged to the first housing 211. Thus, the assembly of the optical system 10 can be finished.

Since the first movable portion 130 and the second movable portion 230 are respectively affix to the first predetermined position and the second predetermined position before assembling the first optical member 120 and the second optical member 220, the optical axis 121 of the first optical member 120 and the optical axis 121 of the second optical member 220 can be substantially aligned when using the optical system 10. In some embodiments, before the first adhesive member G1 is cured, the position of the second optical member 220 relative to the substrate 231 can be slightly adjusted, so as to precisely align the optical axis 121 of the first optical member 120 to the optical axis 121 of the second optical member 220. The optical performance of the optical system 10 can be enhanced.

In some embodiments, in the assembling process of the optical system 10, the user can merely adjust and temporarily affix one of the first movable portion 130 and the second movable portion 230, so as to simplify the process and operating steps.

In summary, an assembling method for an optical system is provided, including: providing a first movable portion, connecting the first movable portion to a first fixed portion, providing a second movable portion, connecting the second movable portion to a second fixed portion, engaging the first fixed portion to the second fixed portion, adjusting the position of the first movable portion relative to the first fixed portion to a first predetermined position and temporarily affixing the first movable portion in the first predetermined position, affixing a first optical member to the first movable portion, and affixing a second optical member to the second movable portion.

The invention also provides an assembling method for an optical system, including: providing a first movable portion, connecting the first movable portion to a first fixed portion, providing a second movable portion, connecting the second movable portion to a second fixed portion, engaging the first fixed portion to the second fixed portion, adjusting the position of the second movable portion to a predetermined position and temporarily affixing the second movable portion in the predetermined position, affixing a second optical member to the second movable portion, and affixing a first optical member to the first movable portion.

Although some embodiments of the present disclosure and their advantages have been described in detail, it should be understood that various changes, substitutions and alterations can be made herein without departing from the spirit and scope of the disclosure as defined by the appended claims. For example, it will be readily understood by those skilled in the art that many of the features, functions, processes, and materials described herein may be varied while remaining within the scope of the present disclosure. Moreover, the scope of the present application is not intended to be limited to the particular embodiments of the process, machine, manufacture, compositions of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps. Moreover, the scope of the appended claims should be accorded the broadest interpretation so as to encompass all such modifications and similar arrangements.

While the invention has been described by way of example and in terms of preferred embodiment, it should be understood that the invention is not limited thereto. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An assembling method for an optical system, comprising:
   providing a first movable portion;
   connecting the first movable portion to a first fixed portion;
   providing a second movable portion;
   connecting the second movable portion to a second fixed portion;
   engaging the first fixed portion to the second fixed portion;
   adjusting the position of the first movable portion relative to the first fixed portion to a first predetermined position, and temporarily affixing the first movable portion in the first predetermined position;
   affixing a first optical member to the first movable portion; and
   affixing a second optical member to the second movable portion.

2. The assembling method as claimed in claim 1, wherein the step of affixing the second optical member to the second movable portion comprises:
   disposing a first adhesive member between the second optical member and the second movable portion; and curing the first adhesive member, wherein the first adhesive member comprises a heat-curing glue.

3. The assembling method as claimed in claim 2, wherein the assembling method further comprises:
before curing the first adhesive member, moving the second optical member to align the optical axis of the second optical member to the optical axis of the first optical member.

4. The assembling method as claimed in claim 2, wherein the step of affixing the second optical member to the second movable portion further comprises:
connecting a second adhesive member to the second optical member and the second movable portion; and
curing the second adhesive member, wherein the second adhesive member comprises a light-curing glue.

5. The assembling method as claimed in claim 4, wherein the second adhesive member is closer to an edge of the second movable portion than the first adhesive member.

6. The assembling method as claimed in claim 1, wherein the step of temporarily affixing the first movable portion in the first predetermined position comprises:
using a jig to affix the first movable portion relative to the first fixed portion.

7. The assembling method as claimed in claim 6, wherein the assembling method further comprises:
after the step of affixing the first optical member to the first movable portion, removing the jig.

8. The assembling method as claimed in claim 1, wherein the step of temporarily affixing the first movable portion in the first predetermined position comprises:
providing a driving assembly; and
using the driving assembly to apply a driving force to the first movable portion.

9. The assembling method as claimed in claim 8, wherein the assembling method further comprises:
after the step of affixing the first optical member to the first movable portion, the driving assembly stops applying the driving force to the first movable portion.

10. The assembling method as claimed in claim 1, wherein the step of affixing the first optical member to the first movable portion comprises:
disposing a sticking member between the first optical member and the first movable portion; and
curing the sticking member, wherein the sticking member comprises a light-curing glue.

11. The assembling method as claimed in claim 1, wherein the step of connecting the first movable portion to a first fixed portion comprises:
using an elastic member to connect the first movable portion and the first fixed portion, wherein the elastic member applies a preload to the first movable portion.

12. The assembling method as claimed in claim 1, wherein the assembling method further comprises:
before the step of affixing the second optical member to the second movable portion, adjusting the position of the second movable portion to a second predetermined position, and temporarily affixing the second movable portion in the second predetermined position.

13. An assembling method for an optical system, comprising:
providing a first movable portion;
connecting the first movable portion to a first fixed portion;
providing a second movable portion;
connecting the second movable portion to a second fixed portion;
engaging the first fixed portion to the second fixed portion;
adjusting the position of the second movable portion to a predetermined position, and temporarily affixing the second movable portion in the predetermined position;
affixing a second optical member to the second movable portion; and
affixing a first optical member to the first movable portion.

14. The assembling method as claimed in claim 13, wherein the step of temporarily affixing the second movable portion in the predetermined position comprises:
using a jig to affix the second movable portion relative to the second fixed portion.

15. The assembling method as claimed in claim 14, wherein the assembling method further comprises:
after the step of affixing the second optical member to the second movable portion, removing the jig.

16. The assembling method as claimed in claim 13, wherein the step of temporarily affixing the second movable portion in the predetermined position comprises:
providing a driving assembly; and
using the driving assembly to apply a driving force to the second movable portion.

17. The assembling method as claimed in claim 16, wherein the assembling method further comprises:
after the step of affixing the second optical member to the second movable portion, the driving assembly stops applying the driving force to the second movable portion.

18. The assembling method as claimed in claim 13, wherein the step of connecting the second movable portion to a second fixed portion comprises:
using an elastic member to connect the second movable portion and the second fixed portion, wherein the elastic member applies a preload to the second movable portion.

19. The assembling method as claimed in claim 13, wherein the assembling method further comprises:
before the step of affixing the first optical member to the first movable portion, moving the first optical member to align the optical axis of the first optical member to the optical axis of the second optical member.

* * * * *